(12) United States Patent
Chen et al.

(10) Patent No.: US 12,161,091 B2
(45) Date of Patent: Dec. 10, 2024

(54) MATERIAL PUSHING APPARATUS AND CHARGING METHOD THEREOF, AND MATERIAL PUSHING MACHINE AND MATERIAL PUSHING METHOD THEREOF

(71) Applicant: FJ Dynamics Technology Co., Ltd, Xiangyang (CN)

(72) Inventors: Liang Chen, Xiangyang (CN); Chao Zheng, Xiangyang (CN); Wei Zhou, Xiangyang (CN); Yi-Cheng Wang, Xiangyang (CN); Di Wu, Xiangyang (CN); Yuan Yao, Xiangyang (CN); Xue-Song Wang, Xiangyang (CN); Sheng Luo, Xiangyang (CN); Xiao-Feng Zhou, Xiangyang (CN)

(73) Assignee: FJ Dynamics Technology Co., Ltd, Xiangyang (CN)

( * ) Notice: Subject to any disclaimer, the term of this patent is extended or adjusted under 35 U.S.C. 154(b) by 159 days.

(21) Appl. No.: 17/789,326

(22) PCT Filed: May 19, 2020

(86) PCT No.: PCT/CN2020/090932
§ 371 (c)(1),
(2) Date: Jun. 27, 2022

(87) PCT Pub. No.: WO2021/135043
PCT Pub. Date: Jul. 8, 2021

(65) Prior Publication Data
US 2023/0049638 A1    Feb. 16, 2023

(30) Foreign Application Priority Data

Dec. 30, 2019 (CN) .......................... 201911398578.6
Dec. 30, 2019 (CN) .......................... 201911403531.4
(Continued)

(51) Int. Cl.
*A01K 5/02* (2006.01)
*G05D 1/00* (2024.01)

(52) U.S. Cl.
CPC ............. *A01K 5/02* (2013.01); *G05D 1/0261* (2013.01)

(58) Field of Classification Search
CPC ............................. A01K 5/02; G05D 1/0261
See application file for complete search history.

(56) References Cited

U.S. PATENT DOCUMENTS

2019/0129443 A1    5/2019  Leclair et al.

FOREIGN PATENT DOCUMENTS

| CN | 104842812 A | 8/2015 |
|---|---|---|
| CN | 105145387 A | 12/2015 |

(Continued)

OTHER PUBLICATIONS

Machine Translation of CN-108207693-A, Tian F, Jun. 2019 (Year: 2019).*

(Continued)

*Primary Examiner* — Tien Q Dinh
*Assistant Examiner* — Katherine June Bolek
(74) *Attorney, Agent, or Firm* — ScienBiziP, P.C.

(57) ABSTRACT

Disclosed are a material pushing apparatus and a charging method thereof, and a material pushing machine and a material pushing method thereof. The material pushing apparatus comprises a charger (200) and a material pushing machine (100), and when the material pushing machine moves to the position where the charger is located, the charger can automatically supplement electric energy to the material pushing machine, such that the automation level of the material pushing apparatus is improved.

14 Claims, 20 Drawing Sheets

(30) Foreign Application Priority Data

Dec. 30, 2019 (CN) .......................... 201922455186.0
Dec. 30, 2019 (CN) .......................... 201922455223.8

(56) References Cited

FOREIGN PATENT DOCUMENTS

| CN | 106818507 A | | 6/2017 | |
|---|---|---|---|---|
| CN | 107150330 A | | 9/2017 | |
| CN | 107306820 A | * | 11/2017 | |
| CN | 108207693 A | | 6/2018 | |
| CN | 108293895 A | | 7/2018 | |
| CN | 108552072 A | * | 9/2018 | ............... A01K 5/02 |
| CN | 109122359 A | | 1/2019 | |
| CN | 109329093 A | * | 2/2019 | ............... A01K 5/02 |
| CN | 208601533 U | | 3/2019 | |
| CN | 209073195 U | | 7/2019 | |
| EP | 1540322 B1 | * | 1/2006 | ............... B08B 3/04 |
| EP | 2334169 B1 | | 5/2013 | |

OTHER PUBLICATIONS

Machine Translation of CN-105145387-A, Wang C, Dec. 2015 (Year: 2015).*
Machine Translation of CN-107306820-A, Dong Y, Nov. 2017 (Year: 2017).*
Machine Translation of CN-10855202-A, Chen W, Sep. 2018 (Year: 2018).*
Machine Translation of EP-1540322-B1, Caderas D, Jan. 2006 (Year: 2006).*
Machine Translation of CN-109329093-A, Yin X, 2019-02-15 (Year: 2019).*

* cited by examiner

MATERIAL PUSHING APPARATUS AND CHARGING METHOD THEREOF, AND MATERIAL PUSHING MACHINE AND MATERIAL PUSHING METHOD THEREOF

TECHNICAL FIELD

The present disclosure relates to a material pushing machinery, in particular to a material pushing apparatus and a charging method thereof, and a material pushing machine and a material pushing method.

BACKGROUND

China has a great consumption demand for milk, and consumption of milk has increased persistently and steadily in recent years along with economic development. To meet the great demand for milk over the country, cow aquaculture models with matched scales and specializations become available. At present, in the scaled and specialized cow aquaculture model, cows are kept in fold yards, and when the cows are to be fed, forage or other food is dropped outside the fold yards so the food doesn't get soiled with excreta on the ground. Cows eat by poking their heads through bars. The forage may be pushed further from the fold yards by the action of the cows eating, and may be pushed beyond the reach of the cows. To continue feeding the cows, the forage needs to be pushed back towards the fold yard many times during the feed. So far, one way is a farm laborer using a shovel to push the forage back towards the fold yard. However, such a method has some disadvantages. Firstly, it is laborer intensive, demanding time and strength. Secondly, the presence of one or more laborers may be unsettling for the cows as they feed. Thirdly, the forage becomes vulnerable to contamination by dirt, germs, and viruses, so that the health of the cows and quality of the milk may be affected. Another way is to use a forklift to push the forage back towards the fold yard. However, a forklift with internal combustion engine is not environmentally friendly, even if the cows were not disturbed by the noise. Moreover, there is a potential safety hazard for the cows during operations of a forklift.

SUMMARY OF THE INVENTION

The present disclosure provides a material pushing apparatus and a charging method thereof, and a material pushing machine, and a material pushing method thereof. The material pushing apparatus provides a material pushing machine driven by electric energy, the material pushing machine may be automatically supplied with the electric energy, so as to improve an automation of the material pushing apparatus.

The present disclosure provides a material pushing apparatus and a charging method thereof, and a material pushing machine and a material pushing method thereof. The material pushing apparatus provides a charger, the charger may automatically supply electric energy for the material pushing machine.

The present disclosure provides a material pushing apparatus and a charging method thereof, and a material pushing machine and a material pushing method thereof. The material pushing machine may automatically move to and match the charger, the charger may automatically supply electric energy for the material pushing machine.

The present disclosure provides a material pushing apparatus and a charging method thereof, and a material pushing machine and a material pushing method thereof. A charging assembly of the charger may be automatically connected to a charging port of the material pushing machine, so the material pushing machine may be automatically matched to the charger, the charger may automatically supply electric energy for the material pushing machine.

The present disclosure provides a material pushing apparatus and a charging method thereof, and a material pushing machine and a material pushing method thereof. The charging assembly and the charging port may be automatically connected based on wireless charging principle, so the material pushing machine may be automatically matched to the charger, the charger may automatically supply electric energy for the material pushing machine. For instance, the charging assembly provides a first charging coil, the charging port provides a second charging coil, and when the material pushing machine and the charger are in a preparable distance, the second charging coil and the first charging coil are capable of automatically communicating, so the charger may automatically supply electric energy for the material pushing machine.

The present disclosure provides a material pushing apparatus and a charging method thereof, and a material pushing machine and a material pushing method thereof. The material pushing machine is driven by electric energy, so it is silent in operation, and this and its small size should avoid the cows being frightened. Additionally, there is no pollution during the material pushing machine in operation, so as to ensure the health of the cows and quality of the milk.

The present disclosure provides a material pushing apparatus and a charging method thereof, and a material pushing machine, and a material pushing method thereof. The material pushing machine may automatically push food such as forage towards a fold yard for providing accessible food for the cows in the fold yard.

The present disclosure provides a material pushing apparatus and a charging method thereof, and a material pushing machine and a material pushing method thereof. The material pushing machine provides a walking device and a material pushing device arranged on the walking device, so that when the walking device walks along a path, the material pushing device rotates to push the forage in a certain direction, so the forage is pushed towards the fold yard.

The present disclosure provides a material pushing apparatus and a charging method thereof, and a material pushing machine and a material pushing method thereof. An annular wall body of the material pushing device is capable of being rotated, so as to improve an efficiency of pushing the forage.

The present disclosure provides a material pushing apparatus and a charging method thereof, and a material pushing machine and a material pushing method thereof. The material pushing device provides two pulley structures, the pulley structures may resist against a lower end of the annular wall body, so as to prevent shaking or waggling of the annular wall body, and prevent eccentricity and waggle of the material pushing machine, and ensuring the reliability and stability of the material pushing machine.

The present disclosure provides a material pushing apparatus and a charging method thereof, and a material pushing machine and a material pushing method thereof. The material pushing device describes a circular orbit, the circular orbit is arranged on the annular wall body in a way of the circular orbit seats to an internal wall of the annular wall body, so the circular orbit may strengthen the annular wall body to prevent out of circularity of the annular wall body, when the annular wall body is drove to rotate related to the holding assembly, the pulley body of each pulley structure may roll on the smooth surface of the circular orbit, so as to reduce noise caused by mutual friction between the pulley structures and the circular orbit, thus the material pushing machine is more silence.

On one hand of the present disclosure, a material pushing machine is provided, the material pushing machine includes:

a walking device, the walking device comprising a holding assembly, a power supply assembly, two walking drive motors, two drive wheels, and a supporting wheel, the holding assembly comprising a base plate, the power supply assembly arranged on the base plate, and each of the two walking drive motors arranged on opposite sides of an end of the base plate and electrically connected to the power supply assembly. Each of the two drive wheels are drivable and connected to each of the two walking drive motors, the supporting wheel being arranged in a middle of the base plate on other end; and a material pushing device, the material pushing device comprising a material pushing wall, the material pushing wall comprising an annular wall body and a connecting arm extending inwardly from a top end of the annular wall body, the connecting arm connected to the holding assembly, the annular wall body surrounding the holding assembly and thereon being rotatable.

On another hand of the present disclosure, a material pushing method of a material pushing machine is provided, the material pushing method includes:
  (a) allowing a walking device to walk along a path outside a fold yard; and
  (b) allowing an annular wall body of a material pushing wall of the material pushing machine to rotate related to a holding assembly of the walking device in a way of surrounding the holding assembly, so the annular wall body push food that away from the fold yard to positions closes to the fold yard.

On another hand of the present disclosure, a material pushing apparatus is provided, the material pushing apparatus includes:
  a charger; and
  a material pushing machine, wherein when the material pushing machine moves to the charger, the charger automatically supplying power to the material pushing machine.

According to an embodiment of the present disclosure, the charger includes a pair of charging electrodes, the material pushing machine comprises a charging port, the pair of charging electrodes are insertable into and becoming electrically connected to the charging port.

On another hand of the present disclosure, a charging method of a material pushing apparatus is provided, the charging method includes:
  (a) moving a material pushing machine to a charger; and
  (b) allowing the charger to automatically supply power to the material pushing machine.

According to an embodiment of the present disclosure, (b) further includes:
  (b.1) applying a charging end of a charging assembly of the charger apart from a charging adapter in a way of a connecting end of the charging assembly being connected to the charging adapter; and
  (b.2) applying the charging end arranged in the charging assembly and a pair of charging electrodes of the charging assembly being electrically connected to the charging adapter inserted and electrically connected to a charging port of the material pushing machine, to allow the charger to automatically supply power to the material pushing machine.

DETAILED DESCRIPTION

Figure 1:
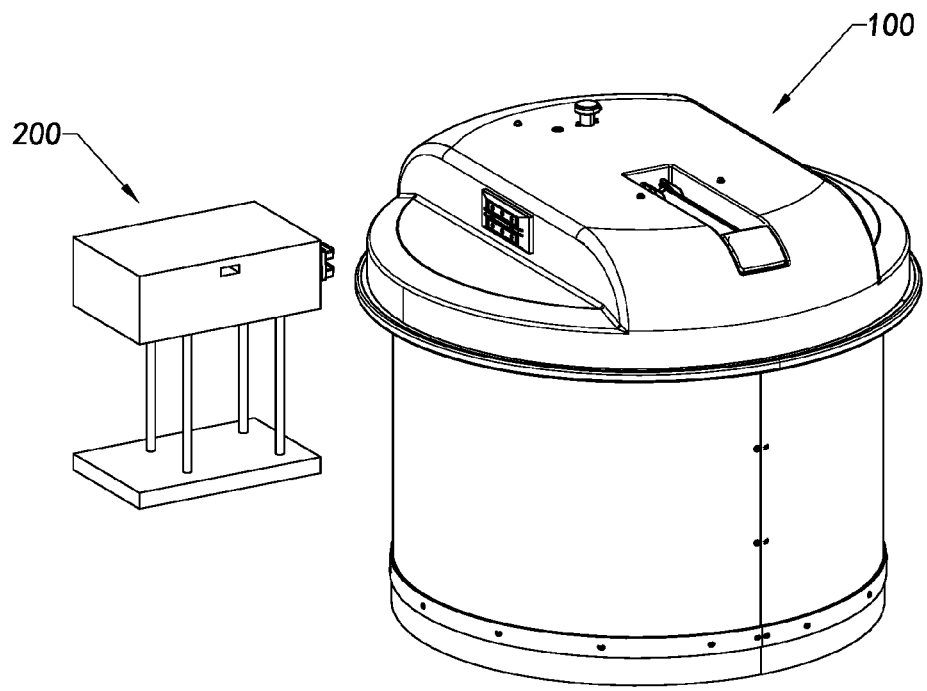
FIG. 1 is a schematic diagram of a material pushing apparatus according to an embodiment of the present disclosure.

The following description discloses the present disclosure so that those skilled in the art can implement the present disclosure. The preferred embodiments in the following description are only examples, and those skilled in the art can think of other obvious variations. In addition, it should be noted that, for ease of description, only some but not all structures related to the present disclosure are shown in the drawings.

Before discussing the exemplary embodiments in more detail, it should be mentioned that some exemplary embodiments are described as processes or methods and depicted as flowcharts. Although the flowchart describes the steps as sequential processing, many of them can be implemented in parallel or concurrently. In addition, the order of the steps can be rearranged. When its operation is completed, the process may be terminated, but there may be additional steps not included in the drawings. Processing can correspond to methods, functions, procedures, subroutines, subroutines, and so on.

In addition, the terms "first", "second" and the like may be used herein to describe various directions, actions, steps or elements, but these directions, actions, steps or elements are not limited by these terms. These terms are used only to distinguish a first direction, action, step, or element from another direction, action, step, or element. For example, in the present disclosure, the first module may be called the second module. Similarly, the second module can be called the first module. Both the first module and the second module are modules, but they are not the same module. The terms "first", "second", etc. cannot be understood as indicating or implying relative importance or implicitly indicating the number of indicated technical features. Thus, the features defining "first" and "second" may explicitly or implicitly include one or more of the features. In the description of the embodiment of the present disclosure, "a plurality of" means at least two, such as two, three, etc., unless otherwise specifically defined.

FIGS. 1 to 8B illustrate a material pushing apparatus according to one embodiment of the present disclosure. The material pushing apparatus includes a material pushing machine 100 and a charger 200. The charger 200 may be electrically connected to a commercial power source and configured to automatically supply power for the material pushing machine 100. For instance, the charger 200 may adjust a voltage of the commercial power source for the material pushing machine 100, when the material pushing machine 100 approaches the charger 200, the material pushing machine 100 may automatically match the charger 200, thus the charger 200 may supply power for the material pushing machine 100.

Referring to FIGS. 3A to 8B, the material pushing machine 100 includes a walking device 10 and a material pushing device 20 arranged on the walking device 10.

In particular, the walking device 10 includes a holding assembly 11, a power supply assembly 12, two walking drive motors 13, two drive wheels 14, and a supporting wheel 15. The holding assembly 11 further includes a base plate 111, the power supply assembly 12 is arranged on and supported by the base plate 111, the charger 200 may automatically supply power for the power supply assembly 12. The two walking drive motors 13 are arranged on opposite ends of the base plate 111, each of the walking drive motors 13 is connected to the power supply assembly 12. The two drive wheels 14 are connected to the walking drive motors 13, the two drive wheels 14 are arranged on opposite ends of the base plate 111. The supporting wheel 15 is mounted in a middle of the base plate 111 on other side, thus the two drive wheels 14 and the supporting wheel 15 form a triangular structure, the two drive wheels 14 and the supporting wheel 15 cooperatively support the base plate 111 above the ground.

Preferably, the two drive wheels 14 are mounted on an output roller of the walking drive motors 13, thus the two drive wheels 14 may be connected to and driven by the walking drive motors 13. The supporting wheel 15 may be a universal wheel able to pivot through 360 degrees, for turning of the material pushing machine 100 in any direction.

It should be known that, a shape of the base plate 111 is not limited, as shown in FIGS. 3A to 8B, the base plate 111 is substantially square, a center of gravity of the power supply assembly 12 coincides with a center of gravity of the base plate 111 in height, thus preventing any decline of a center of gravity of the material pushing machine 100, and ensuring a reliability and a stability of the material pushing machine 100. Preferably, in other embodiments of the material pushing machine 100, the base plate 111 may be, but is not limited to, circular, elliptic, and polygonal.

The material pushing device 20 includes a material pushing wall 21, the material pushing wall 21 includes an annular wall body 211 and a connecting arm 212 extending from a top to a middle of the annular wall body 211. The connecting arm 212 is rotatably amounted on the holding assembly 11, the annular wall body 211 rotatably surrounds the holding assembly 11, thus the material pushing wall 21 forms the exterior of the material pushing machine 100. Thus, when the material pushing machine 100 pushes the materials, forage or other food may not enter interior of the material pushing machine 100, and the walking device 10 will not be affected. For instance, the forage may be straw or a mixture of straw and fodder, the straw is substantially long and thin, the material pushing wall 21 is arranged on outside of the holding assembly 11 and forms the appearance of the material pushing machine 100, which may prevent the forage entering the internal of the material pushing machine 100 and affecting the walking device 10, so as to ensure a reliability and a stability of the material pushing machine 100.

In the material pushing machine 100 of the present disclosure, when the power supply assembly 12 is controlled to provide power for each of the walking drive motors 13, each of the walking drive motors 13 may convert electric energy into kinetic energy to drive each of the drive wheels 14 to run, thus, the walking device 10 may walk or at least follow a path. It should be known that, when rotation speeds of the two walking drive motors 13 are the same, the walking device 10 is configured to walk straight along a path; when rotation speeds of the two walking drive motors 13 are different, the motion of the walking device 10 will be in a curve. For instance, when one of the walking drive motors 13 is rotating, and the other of the walking drive motors 13 is not working, the walking device 10 may make a sharp turn.

A type of the power supply assembly 12 is not limited, such as the power supply assembly 12 may be a storage battery (such as but is not limited to lithium battery), when the electric energy stored in the power supply assembly 12 is consumed, the power supply assembly 12 will replenish electric energy. Or the power supply assembly 12 may include a storage battery (such as but is not limited to lithium battery), when the electric energy stored in the power supply assembly 12 is consumed, the power supply assembly 12 will replenish electric energy.

Furthermore, the walking device 10 includes a controller 16, the power supply assembly 12 and each of the walking drive motors 13 are connected to the controller 16, the controller 16 controls power supply ways of the power supply assembly 12 to the walking drive motors 13. Preferably, the controller 16 is arranged on and supported by the base plate 111. Optionally, the controller 16 is arranged on the power supply assembly 12, or the controller 16 and the power supply assembly 12 are integrated.

A type of the controller 16 is not limited, and may have a calculating function and a controlling function. For instance, the controller 16 may control a power from the power supply assembly 12 to each of the walking drive motors 13 according to a real-time status of the material pushing machine 100, so as to adjust a walking or path of movement of the material pushing machine 100.

Referring to FIGS. 3A to 8B, the holding assembly 11 includes at least two support columns 112, a lower holding platform 113, and an upper holding platform 114. A lower end of each support column 112 is arranged on edges of the base plate 111 and extended from the edges of the base plate 111 to a predetermined height. A periphery of the lower holding platform 113 is arranged in a middle portion of each support column 112, so each support column 112 may support and maintain the lower holding platform 113 on the base plate 111, and a first receiving space 1101 of the holding assembly 11 is formed between the base plate 111 and the lower holding platform 113. A periphery of the upper holding platform 114 is arranged in an upper portion of each support column 112, so each support column 112 may support and maintain the upper holding platform 114 over the lower holding platform 113, and a second receiving space 1102 of the holding assembly 11 is formed between the lower holding platform 113 and the upper holding platform 114.

In other words, the holding assembly 11 has the first receiving space 1101 and the second receiving space 1102. The first receiving space 1101 is formed between the base plate 111 and the lower holding platform 113, for receiving the power supply assembly 12 mounted on the base plate 111. The second receiving space 1102 is formed between the lower holding platform 113 and the upper holding platform 114, for receiving the controller 16 mounted on the lower holding platform 113. It should be known that, other electrical components (such as but is not limited to fuse, power manager, communication module) of the walking device 10 may also be received in the second receiving space 1102 and contained in the lower holding platform 113.

Optionally, in other embodiment of the material pushing machine 100, the holding assembly 11 has only one holding platform, the holding platform is arranged on an upper end of each support column 112, a receiving space is formed between the base plate 111 and the holding platform, the power supply assembly 12 and the controller 16 arranged on the base plate 111 are received in the receiving space.

Particularly, the material pushing machine 100 as shown in FIGS. 3A to 8B, the holding assembly 11 includes four support columns 112, a lower end of each support column 112 is arranged at a corner of the base plate 111. Each corner of the lower holding platform 113 is arranged at middle portion of each support column 112, so each support column 112 may maintain the lower holding platform 113 above the base plate 111, the first receiving space 1101 is formed between the base plate 111 and the lower holding platform 113. Each corner of the upper holding platform 114 is at upper portion of each support column 112, so each support column 112 holds the upper holding platform 114 above the lower holding platform 113, the second receiving space 1102 is formed between the lower holding platform 113 and the upper holding platform 114.

Referring to FIGS. 3A to 8B, the holding assembly 11 further includes a mounting column 115 and a drive ring 116. The mounting column 115 is arranged from a center position of the upper holding platform 114 extending upwardly to form a free end 1150. The drive ring 116 is rotatably mounted to a middle portion of the mounting column 115.

A manner of the mounting column 115 being arranged on the upper holding platform 114 is not limited, for instance, the mounting column 115 and the upper holding platform 114 may be integrally formed, or the mounting column 115 is a screw joint to the upper holding platform 114, or the mounting column 115 is welded to the upper holding platform 114.

A manner of the drive ring 116 being rotatably mounted to the mounting column 115 is not limited, for instance, the drive ring 116 is rotatably mounted to the mounting column 115 through a bearing.

The walking device 10 further includes a material pushing drive motor 17. The material pushing drive motor 17 is arranged on the upper holding platform 114 and electrically connected to the power supply assembly 12, when the power supply assembly 12 supplies power to the material pushing drive motor 17, the material pushing drive motor 17 may convert electric energy into kinetic energy. Preferably, the material pushing drive motor 17 is connected to the controller 16, so the controller 16 may control manner of supplying power to the material pushing drive motor 17. The drive ring 116 is drivable and connected to the material pushing drive motor 17. The connecting arm 212 of the material pushing wall 21 is extended to and fixedly amounted to the drive ring 116. When the power supply assembly 12 supplies power to the material pushing drive motor 17, the material pushing drive motor 17 rotates the drive ring 116 relative to the walking device 10 around periphery of the holding assembly 11.

The walking device 10 further includes a transmission belt 18. Opposite ends of the transmission belt 18 are mounted to an output roller of the material pushing drive motor 17 and the drive ring 116, so the drive ring 116 is drivable and connected to the material pushing drive motor 17. Optionally, in other embodiments of the material pushing machine 100, the output roller of the material pushing drive motor 17 includes a gear structure and the drive ring 116 includes a gear structure, so the gear structure of the drive ring 116 engages with the gear structure of the material pushing drive motor 17, thus the drive ring 116 is drivable and connected to the material pushing drive motor 17.

Referring to FIGS. 3A to 8B, the material pushing device 20 further includes at least two pulley structures 22. Each pulley structure 22 includes a mounting body 221 and a pulley body 222 rotatably mounted on the mounting body 221. The pulley structures 22 are maintained between the annular wall body 211 and the holding assembly 11, the pulley structures 22 are mounted to the holding assembly 11 through the mounting body 221 such that the pulley body 222 resists the annular wall body 211. When pushing the material, when the annular wall body 211 is unilaterally stressed, each pulley structure 22 acts to prevent waggling and eccentric rotation of the annular wall body 211, so as to prevent eccentricity and waggle of the material pushing machine 100, and ensuring the reliability and stability of the material pushing machine 100.

Preferably, the mounting body 221 of each pulley structure 22 is mounted to a lower end of each support column 112, so the pulley structures 22 resists the annular wall body 211 at the lower end of the annular wall body 211. When pushing the material, each pulley structure 22 prevents waggles and eccentric rotation of the annular wall body 211.

Optionally, the annular wall body 211 of each pulley structure 22 is mounted to the base plate 111, so the pulley structures 22 may resist the annular wall body 211 at the lower end of the annular wall body 211. When the material pushing machine 100 is pushing the material, when the annular wall body 211 is unilaterally stressed, each pulley structure 22 may prevent waggles of the annular wall body 211.

Preferably, a quantity of the pulley structures 22 and a quantity of the support columns 112 is same, such as in the material pushing machine 100 as shown in FIGS. 3A to 8B, the quantity of the pulley structures 22 and the quantity of the support columns 112 are four, the lower end of each support column 112 carries one pulley structure 22.

Referring to FIGS. 3A to 8B, the material pushing device 20 further includes a circular orbit 23. The circular orbit 23 is arranged on the annular wall body 211 such that the circular orbit 23 seats to an internal wall of the annular wall body 211, so the circular orbit 23 may strengthen the annular wall body 211 to maintain a perfect roundness and circularity of the annular wall body 211. The pulley body 222 of each pulley structure 22 seats to a smooth surface of the circular orbit 23 to resist the annular wall body 211. Thus, when the annular wall body 211 is rotated relative to the holding assembly 11, the pulley body 222 of each pulley structure 22 may roll on the smooth surface of the circular orbit 23, so as to reduce noise caused by friction between the pulley structures 22 and the circular orbit 23, thus the material pushing machine 100 is more silent.

Referring to FIGS. 3A to 8B, the material pushing wall 21 includes at least two roller half bodies 210. Each roller half body 210 includes a roller wall 2101 and an extending arm 2102 extended from an upper end of the roller wall 2101. The roller walls 2101 of adjacent roller half bodies 210 may be mounted to each other, after the roller half bodies 210 are mounted, the roller wall 2101 of each roller half body 210 forms the annular wall body 211, the extending arm 2102 of each roller half body 210 forms the connecting arm 212.

Particularly, the material pushing wall 21 includes two roller half bodies 210, one of the two roller half bodies 210 is defined as first roller half body 210a, the other of the two roller half bodies 210 is defined as second roller half body 210b. Each of the first roller half body 210a and the second roller half body 210b includes one roller wall 2101 and one extending arm 2102. The roller wall 2101 of the first roller half body 210a and the roller wall 2101 of the second roller half body 210b are mounted to each other to form the annular wall body 211, the extending arm 2102 of the first roller half body 210a and the extending arm 2102 of the second roller half body 210b form the connecting arm 212. Correspondingly, the circular orbit 23 includes a first circular orbit 23a and a second circular orbit 23b. The first circular orbit 23a is arranged on the roller wall 2101 of the first roller half body 210a, the second circular orbit 23b is arranged on the roller wall 2101 of the second roller half body 210b. After the roller wall 2101 of the first roller half body 210a and the roller wall 2101 of the second roller half body 210b are mounted to each other to form the annular wall body 211, the first circular orbit 23a and the second circular orbit 23b form a complete circular orbit 23.

Referring to FIGS. 3A to 8B, the material pushing machine 100 further includes a magnetic sensor 30. The magnetic sensor 30 is arranged on a lower portion of the base plate 111. The magnetic sensor 30 is capable of communicating with magnetic navigation markers lying outside the fold yard, for guiding the walking device 10 to move along a path.

Referring to FIGS. 3A to 8B, the material pushing machine 100 further includes a cover device 40. The cover device 40 includes a cover 41. A center position of the cover 41 is mounted to the free end 1150 of the mounting column 115, so the cover 41 may be supported by the holding assembly 11. A periphery of the cover 41 extends outwardly, thus a diameter of the cover 41 is greater than the periphery of the annular wall body 211, so the cover 41 protects and shields an upper portion of the annular wall body 211.

The cover device 40 further includes a hold pole 42 and a distance sensor 43 arranged on an end of the hold pole 42. The other end of the hold pole 42 is arranged to the cover 41. The distance sensor 43 may obtain a distance between the material pushing machine 100 and the fold yard for adjusting the distance between the material pushing machine 100 and the fold yard when adjustment is required. Preferably, the hold pole 42 is rotatably mounted to the cover 41 for adjusting an angle between the hold pole 42 and the cover 41. For instance, when the material pushing machine 100 is in operation, the hold pole 42 may rotate related to the cover 41, so the hold pole 42 and the cover 41 may have a greater angle, and so as to adjust the distance between the distance sensor 43 and the fold yard. Preferably, the hold pole 42 is an expansion pole, that is, a length of the hold pole 42 may be adjusted, thus, through adjusting the length of the hold pole 42 and the angle between the hold pole 42 and the cover 41, the distance between the distance sensor 43 and the fold yard may be adjusted conveniently and flexibly. Preferably, the cover 41 includes a maintain groove 411 for receiving the hold pole 42.

Furthermore, the mounting column 115 is a cylindrical or hollow mounting column, that is, the mounting column 115 includes a connected channel 1151 for connecting the second receiving space 1102 and the external space of the upper holding platform 114. Cables connected to the distance sensor 43 may be extended from the external space of the upper holding platform 114 to the second receiving space 1102 through the connected channel 1151.

Referring to FIGS. 3A to 8B, the material pushing machine 100 further includes a charging port 50. The charging port 50 is arranged on the cover 51 and electrically connected to the power supply assembly 12, so the material pushing machine 100 may obtain electric energy from power supply assembly through the charging port 50. Preferably, cables connected to the charging port 50 may be extended from the external space of the upper holding platform 114 to the first receiving space 1101 through the connected channel 1151, and be connected to the power supply assembly 12.

Figure 2A:
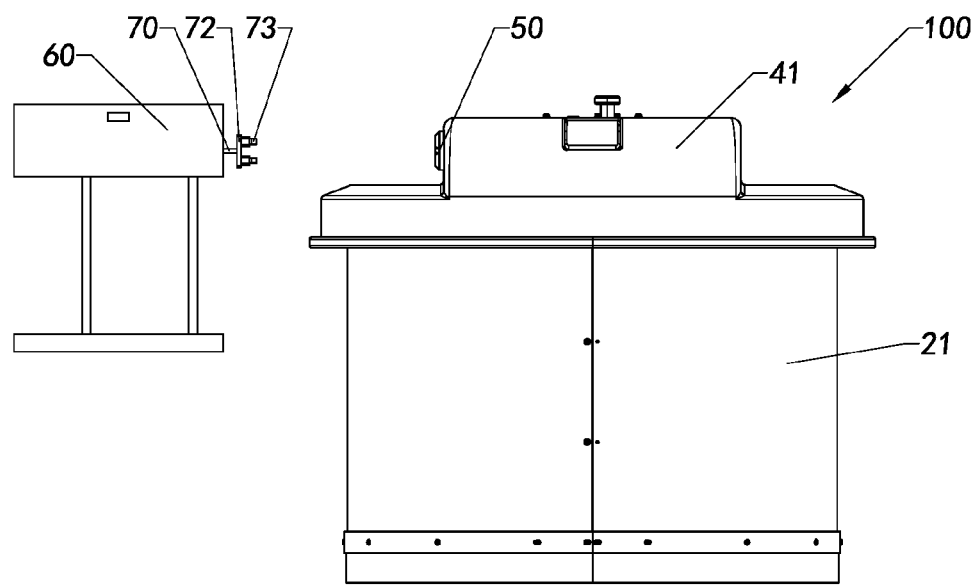
FIGS. 2A and 2B are schematic diagrams of the material pushing apparatus in different states according to the embodiment of the present disclosure, showing a relationship of a material pushing machine and a charger.
Figure 2B:
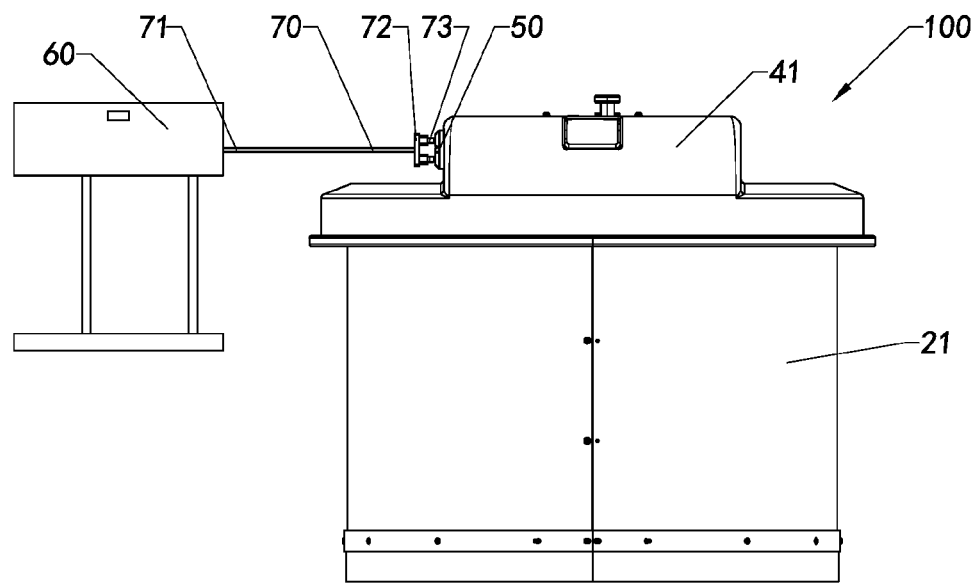
Figure 3A:
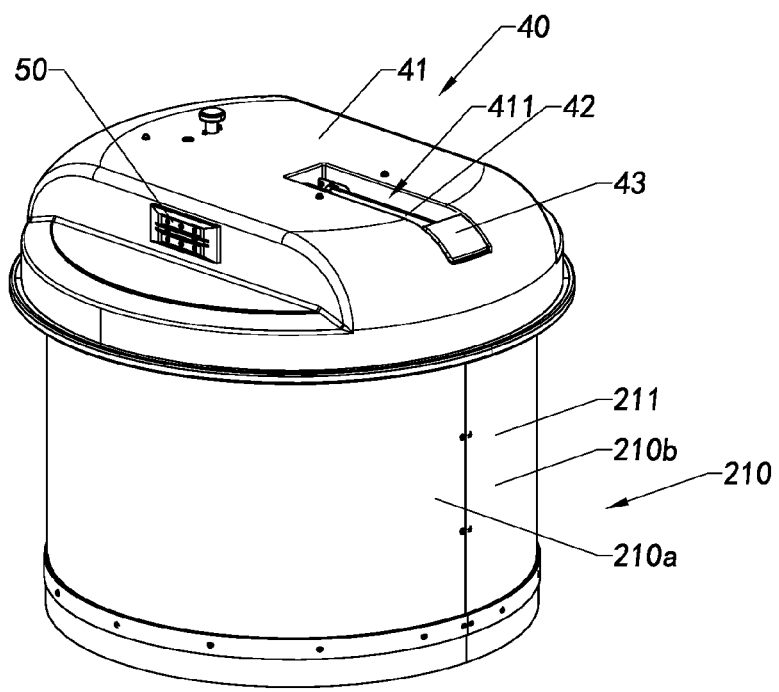
FIGS. 3A and 3B show different views of the material pushing machine of the material pushing apparatus according to an embodiment of the present disclosure.
Figure 3B:
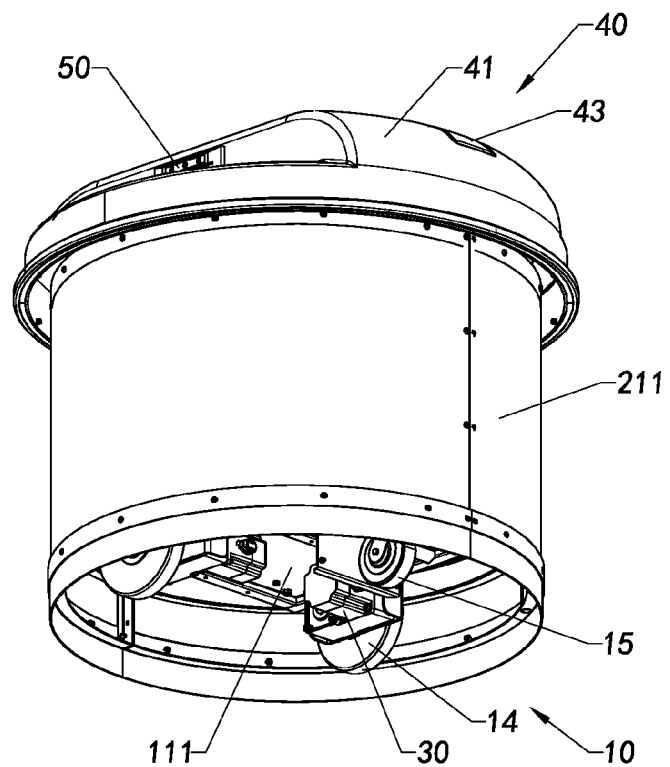
Figure 4:
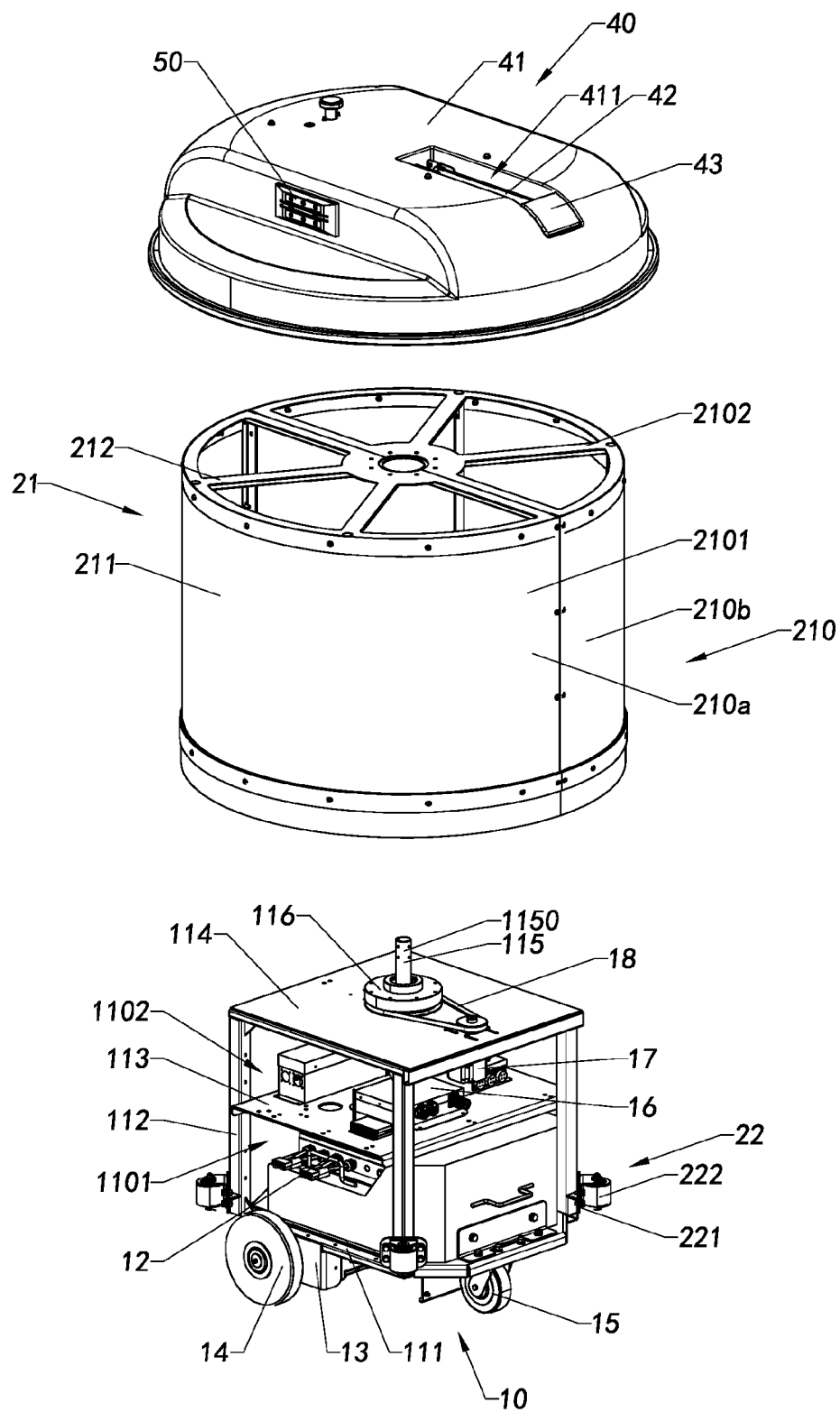
FIG. 4 is an exploded diagram of the material pushing machine of the material pushing apparatus, showing relationship of a walking device and a material pushing device.
Figure 5:
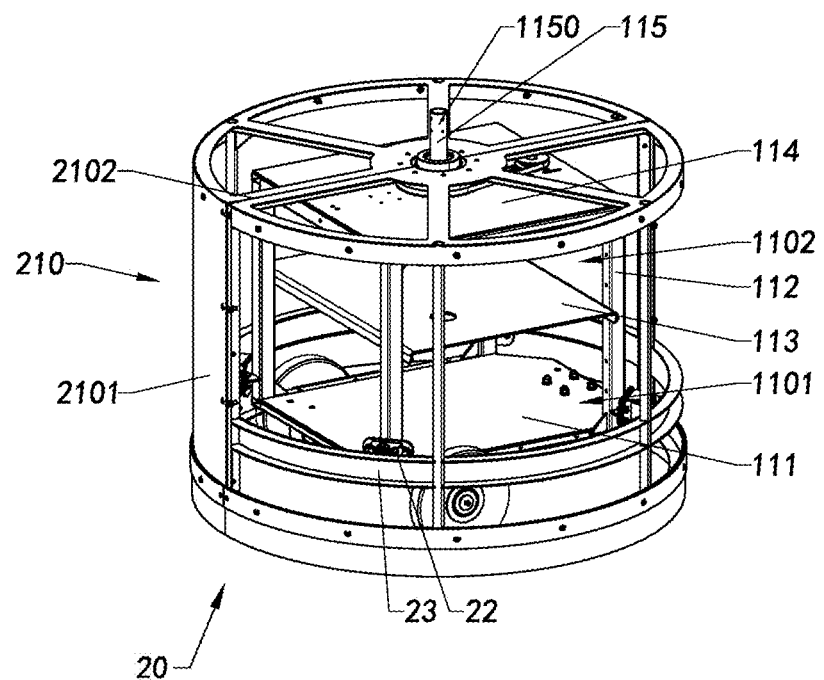
FIG. 5 is a schematic diagram of part of the material pushing machine of the material pushing apparatus, showing a relationship of the walking device of the material pushing machine and a material pushing wall of the material pushing device.
Figure 6:
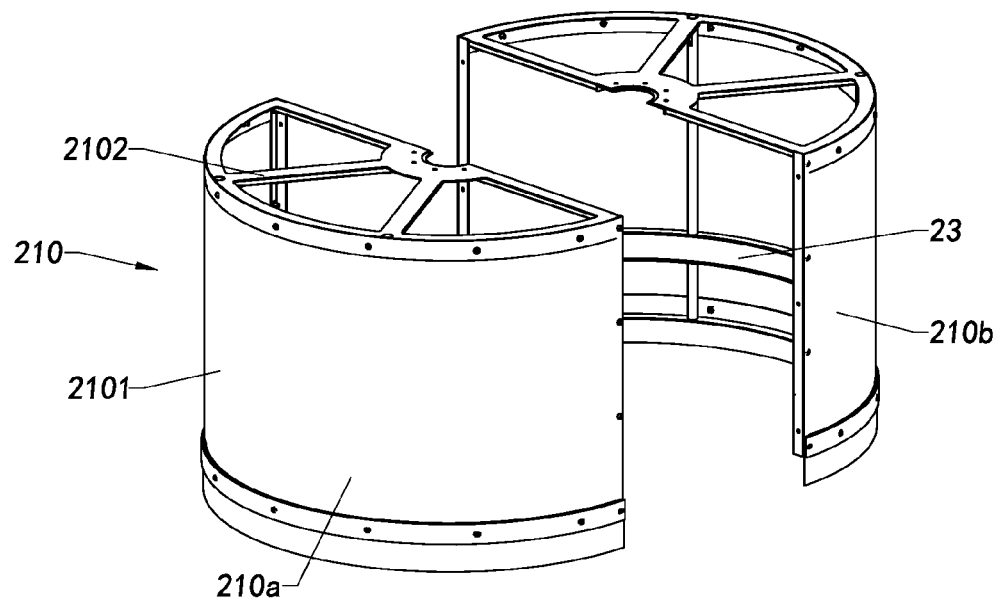
FIG. 6 is a schematic diagram of part of the material pushing machine of the material pushing apparatus, showing a relationship of the material pushing wall and other components.
Figure 7:
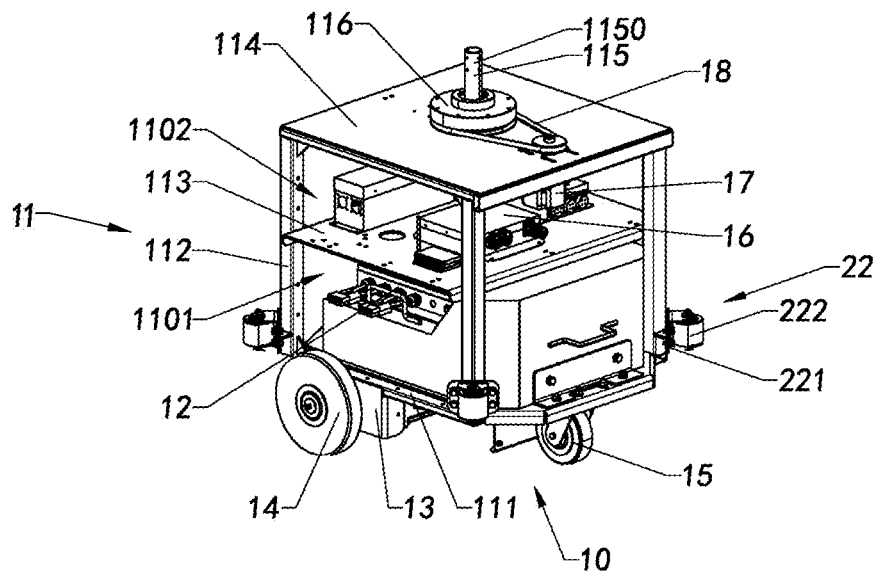
FIG. 7 is a schematic diagram of part of the material pushing machine of the material pushing apparatus, showing a relationship of the walking device and other components.
Figures 8A, 8B:
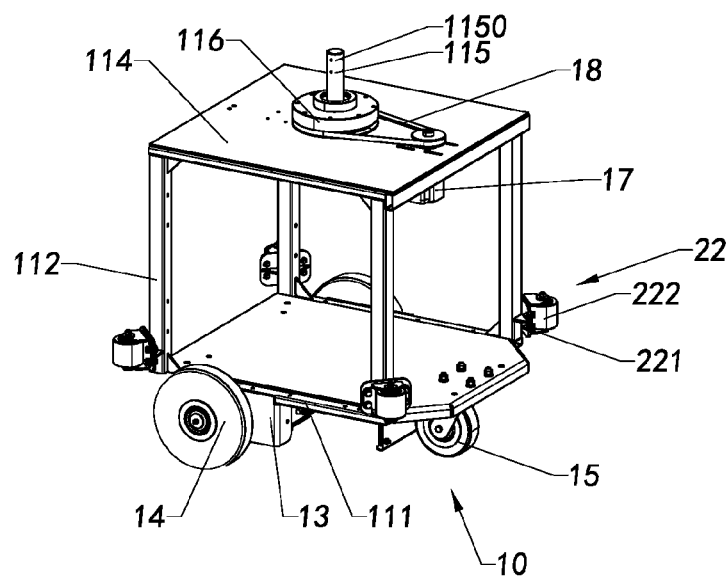
FIGS. 8A and 8B show different views of the material pushing machine of the material pushing apparatus, showing structural relationships of the walking device and other components.

Referring to FIGS. 1 to 2B, the charger 200 includes a charging adapter 60 and a charging assembly 70. The charging assembly 70 includes a connecting end 71, a charging end 72 corresponding to the connecting end 71, and a pair of charging electrodes 73 arranged on the charging end 72. The connecting end 71 is movably mounted on the charging adapter 60. The charging assembly 70 brings the charging end 72 closer to or away from the charging adapter 60. Preferably, the connecting end 71 is drivable and mounted on the charging adapter 60, the charging adapter 60 may drive the charging assembly 70 bring the charging end 72 closer to or away from the charging adapter 60. For instance, the charging adapter 60 may internally include a drive motor and a mounting channel. The connecting end 71 may extend to an interior of the charging adapter 60 through the mounting channel and be drivable and mounted to the drive motor. The drive motor may drive the connecting end 71, thus relative positions of the charging assembly 70 and the charging adapter 60 may be changed, so the charging end 72 approaches or moves away from the charging adapter 60.

When the material pushing machine 100 needs power supply, the charging adapter 60 of the charger 200 may drive the charging assembly 70 to bring the charging end 72 closer to or away from the charging adapter 60, the charging end 72 may be inserted into the charging port 50, the charging electrodes 73 may electrically connect to the charging port 50, so the charging adapter 60 may supply electric energy to the power supply assembly 12. After the material pushing machine 100 is supplied with electric energy, the charging adapter 60 may drive the charging assembly 70 to move the charging end 72 away from the charging port 50 and closer to the charging adapter 60.

FIGS. 9A to 9F illustrate an operation process of the material pushing machine 100. A number of cows 1000 are in a same fold yard 2000, there is at least one magnetic navigation path 3000 arranged between adjacent fold yards 2000, food 4000, such as forage, is arranged outside of the fold yard 2000 for consumption by the cows 1000 in the fold yard 2000.

Figure 9A:
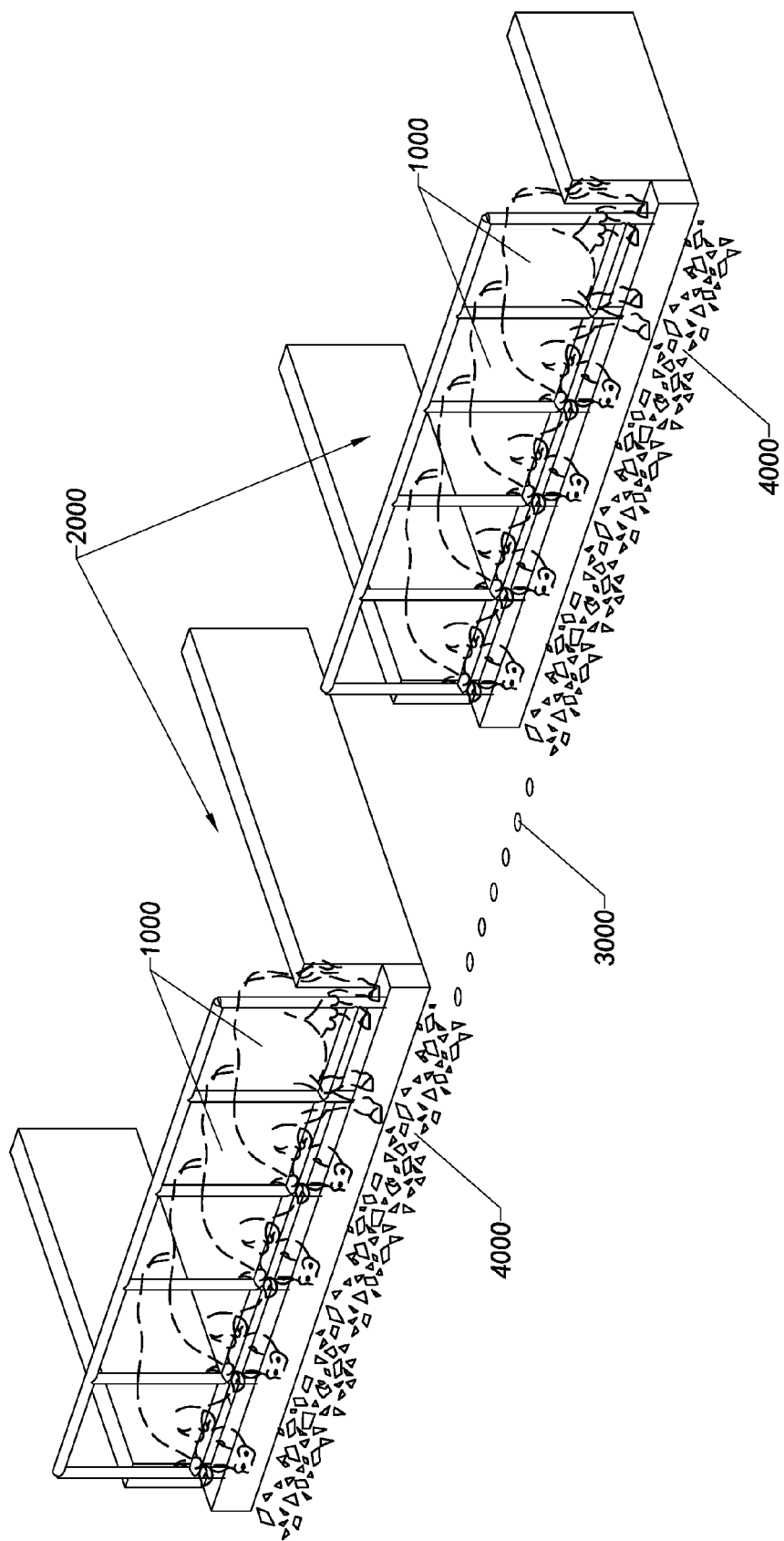
FIGS. 9A to 9F show material pushing process of the material pushing machine of the material pushing apparatus.
Figure 9B:
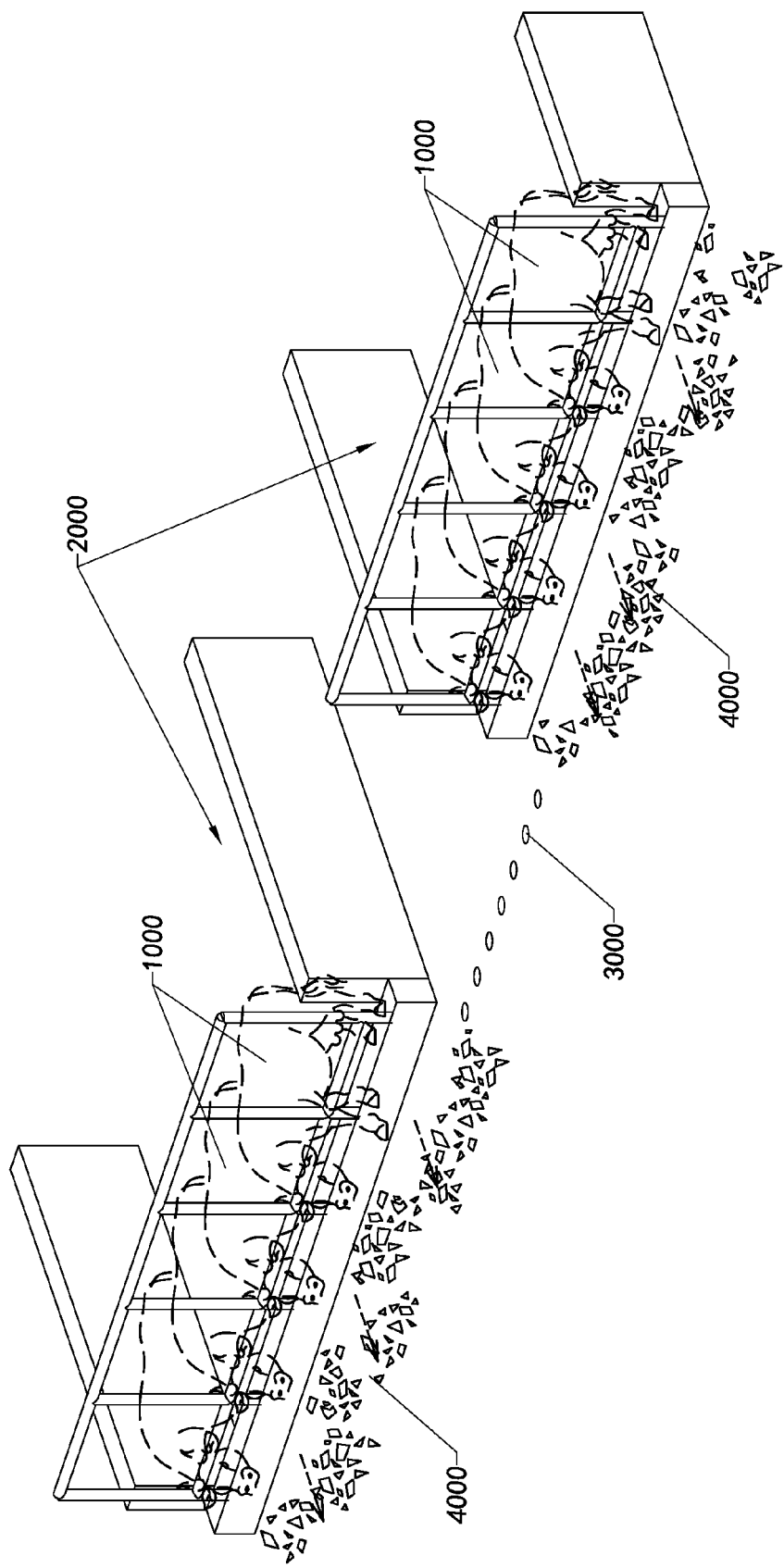

Referring to FIGS. 9A to 9B, when the cows 1000 in the fold yard 2000 may stretch out of the fold yard 2000 to eat the food 4000, the cows 1000 may, in act of eating, push the food 4000 away from the fold yard 2000, in such situation, the cows 1000 may not reach and eat all the food 4000.

Figure 9C:
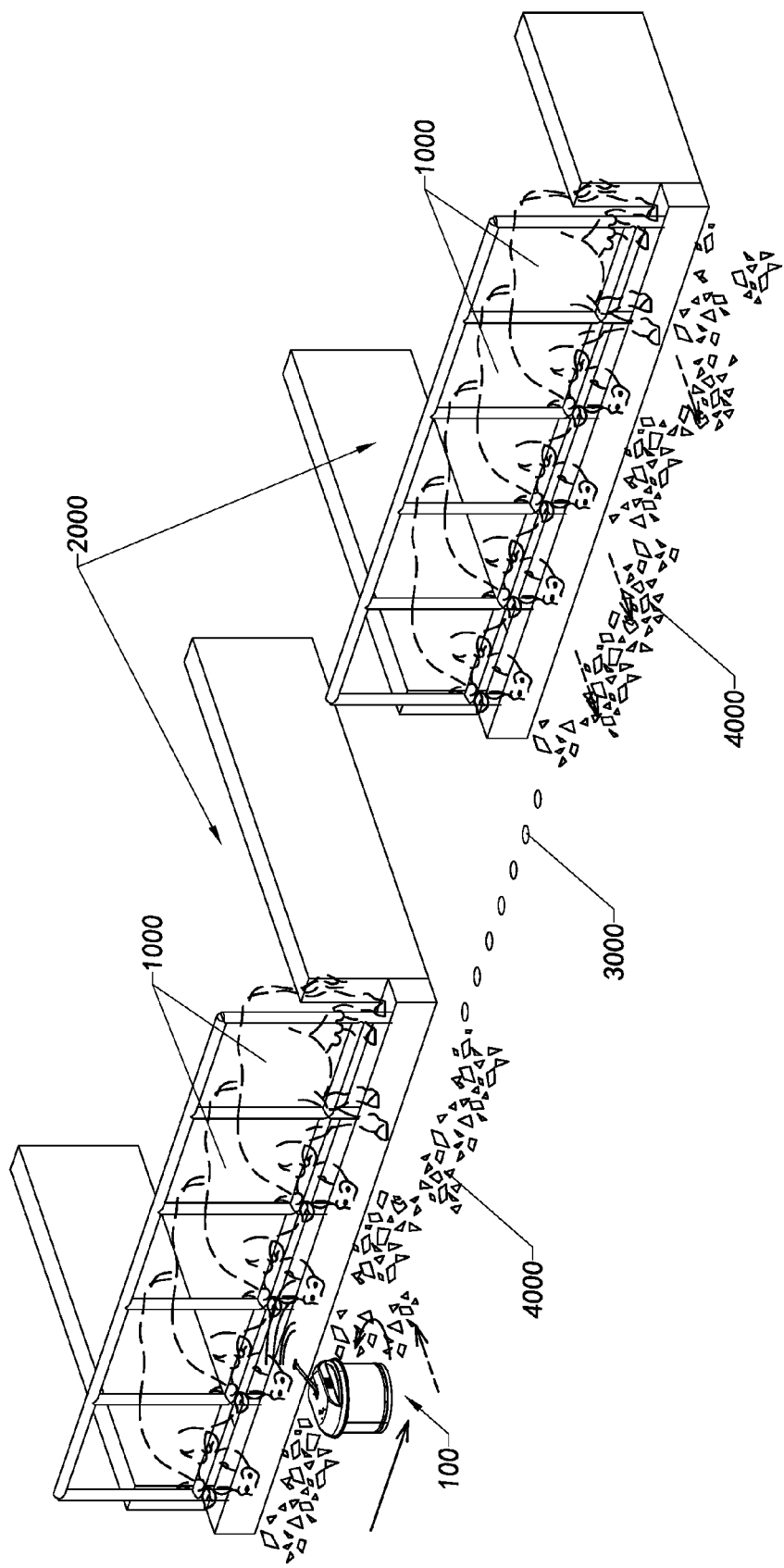
Figure 9D:
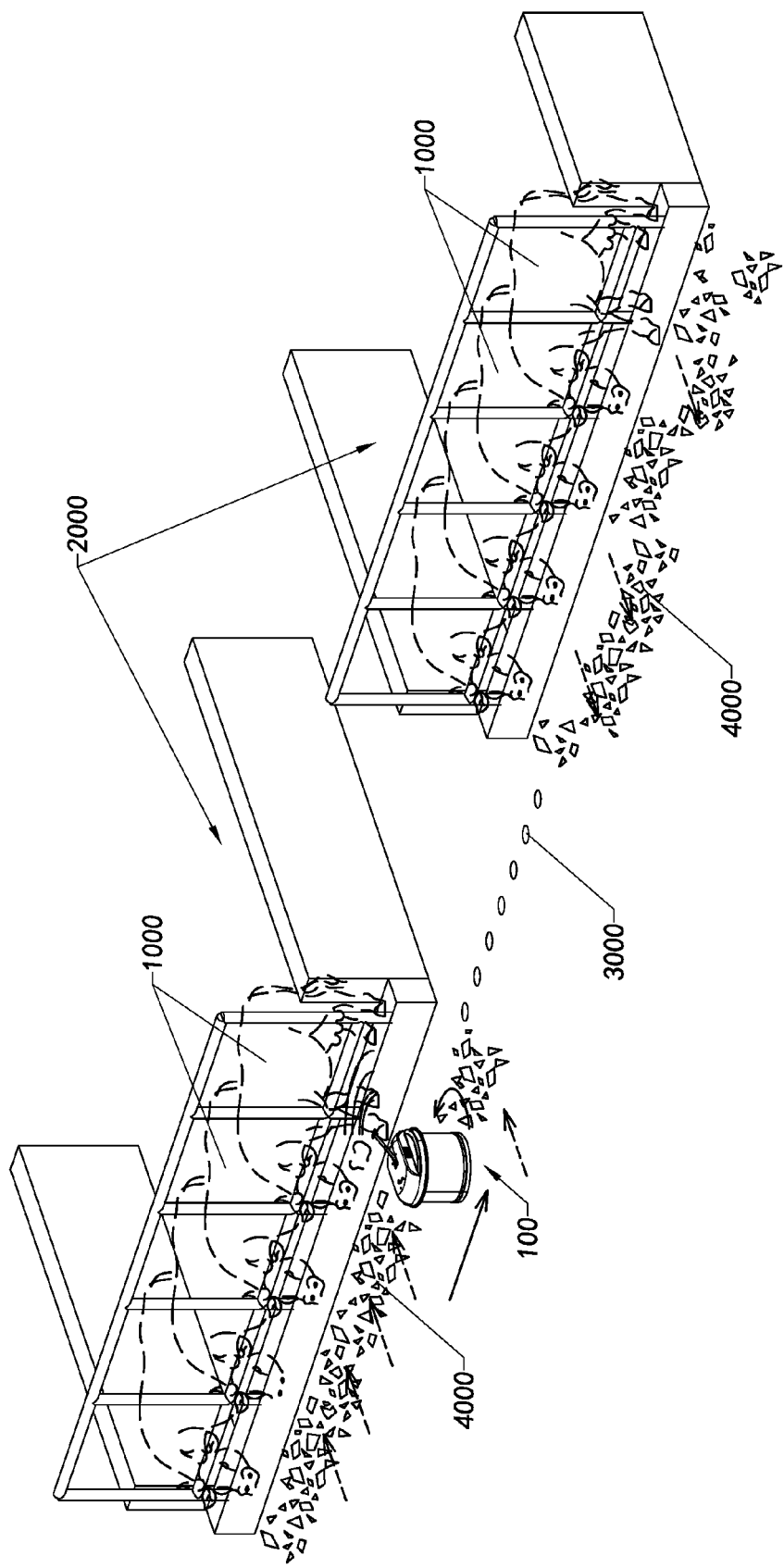

Referring to FIGS. 9C and 9D, the material pushing machine 100 is used for pushing distant food 4000 towards the fold yard 2000, for being reached by the cows 1000 in the fold yard 2000. Particularly, when the walking device 10 is moving, the annular wall body 211 of the material pushing device 20 may be rotated relative to the holding assembly 11, so the annular wall body 211 may push back the food 4000 closer towards the fold yard 2000, for being reached by the cows 1000 in the fold yard 2000. During the process, the distance sensor 43 may detect the distance between the material pushing machine 100 and the fold yard 2000 in real time, to ensure the food 4000 is correctly replaced closer to the fold yard 2000.

Figure 9E:
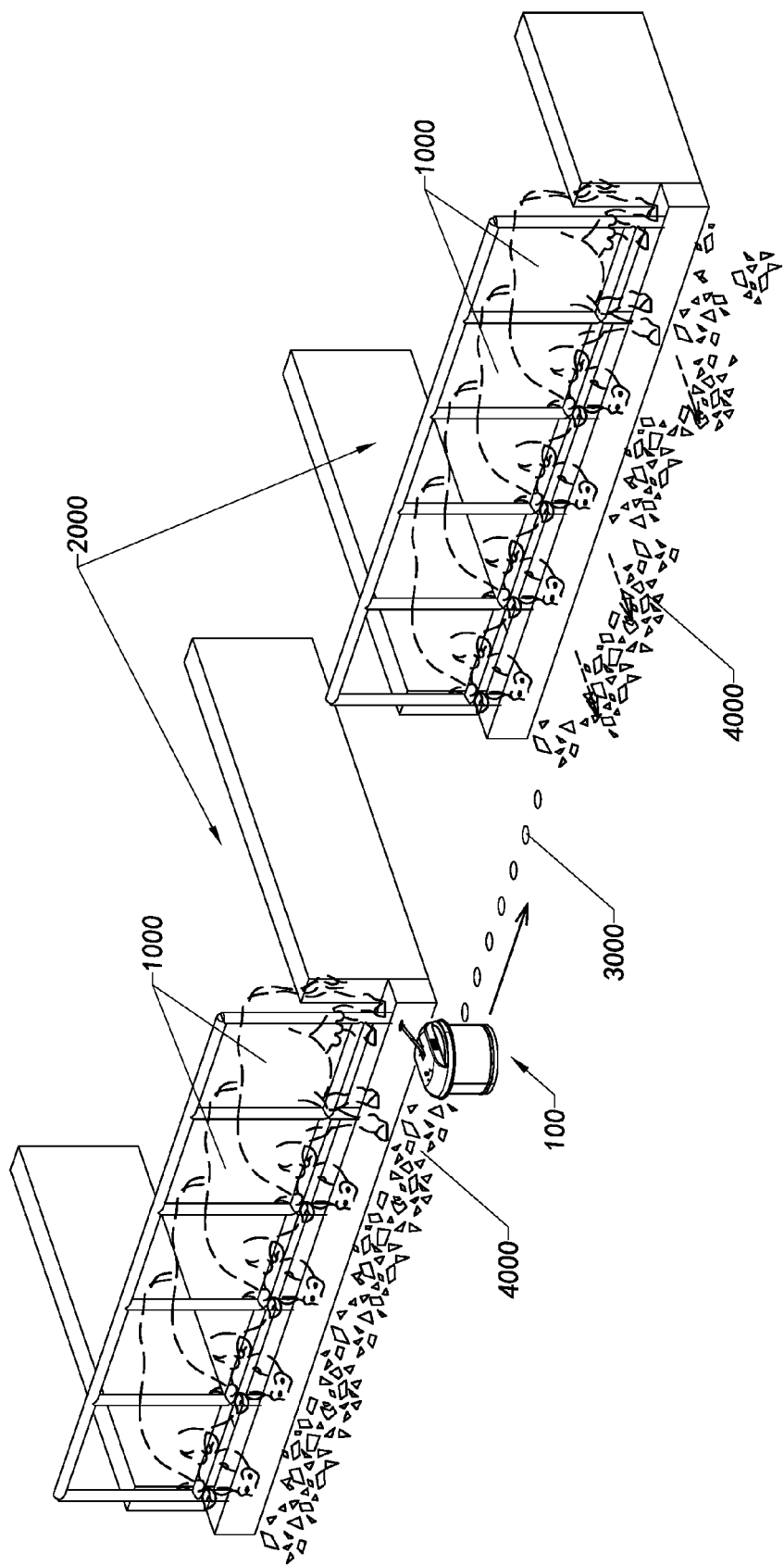
Figure 9F:
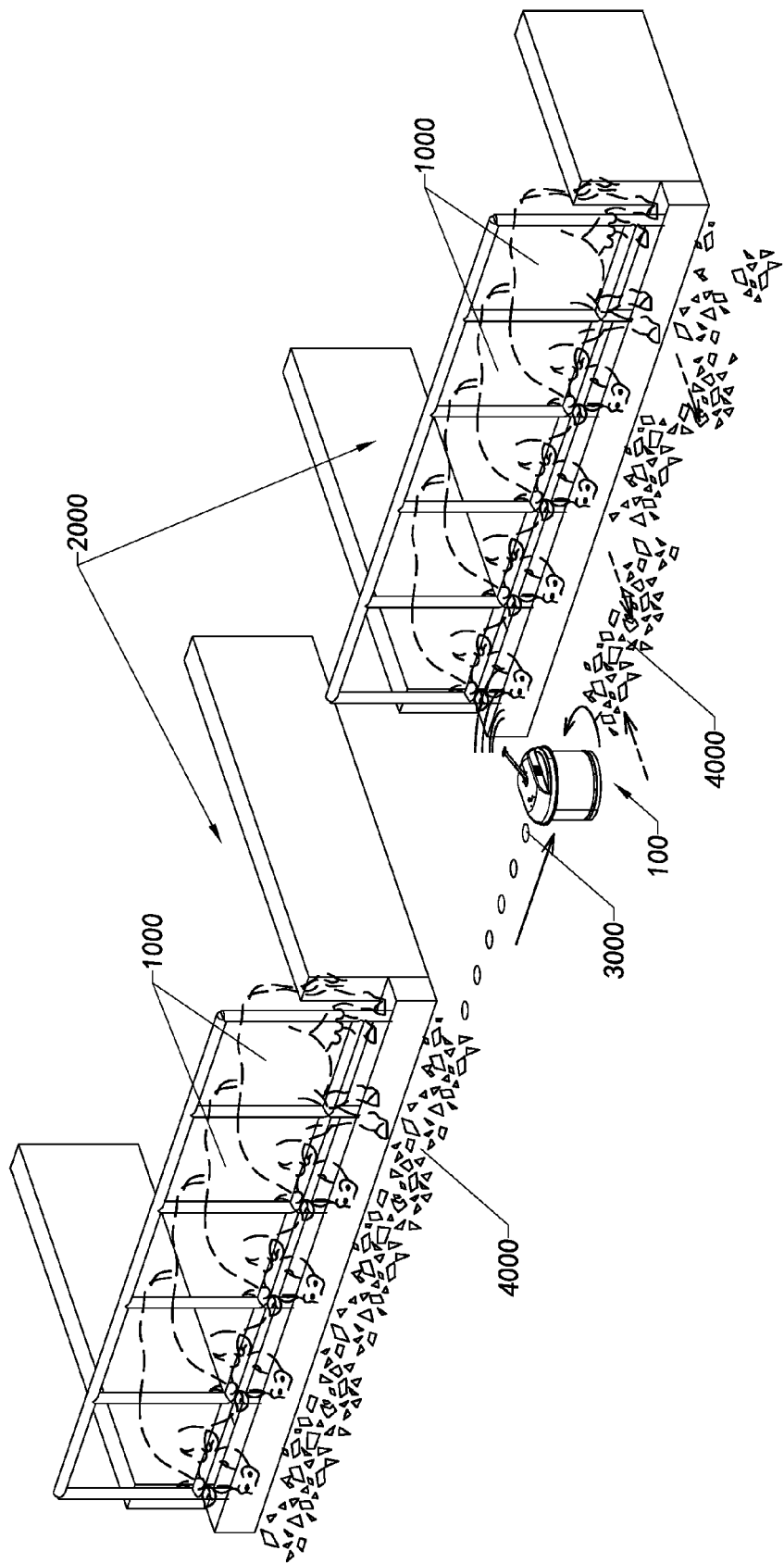

Referring to FIGS. 9E and 9F, when the material pushing machine 100 needs to move from one position of the fold yard 2000 to another position of the fold yard 2000, the magnetic sensor 30 and the magnetic navigation path 3000 may cooperatively and correctly guide the material pushing machine 100 to move from one position of the fold yard 2000 to another position of the fold yard 2000.

In another hand of the present disclosure, a material pushing method of the material pushing machine 100 is provided, the material pushing method includes the following:
  (a) allowing the walking device 10 to move along a path outside the fold yard 2000; and
  (b) allowing the annular wall body 211 being driven to rotate related to the holding assembly 11 in a way of surrounding the holding assembly 11, so the annular wall body 211 may push or brush or throw displaced food 4000 closer to the fold yard 2000.

In one embodiment, in the process (a), the path is predetermined, such as arranging magnetic guiding elements in advance outside the fold yard 2000 to form the magnetic navigation path 3000, so the magnetic navigation path 3000 may indicate the predetermined path. In another embodiment, in the process (a), the distance sensor 43 detects the distance between the material pushing machine 100 and the fold yard 2000 in real time and plans and executes the path in real time.

In one embodiment, in the process (b), when the walking device 10 moves along the path and the material pushing machine 100 pushes the food 4000, friction generated between the food 4000 and the annular wall body 211 may drive the annular wall body 211 to rotate related to the holding assembly 11, thus the annular wall body 211 surrounds the holding assembly 11 to push the food 4000. In another embodiment, in the process (b), the material pushing drive motor 17 drives the annular wall body 211 to rotate relative to the holding assembly 11, so the annular wall body 211 surrounds the holding assembly 11 to push the food 4000.

Preferably, when the material pushing drive motor 17 drives the annular wall body 211 to rotate related to the holding assembly 11 at the upper end of the annular wall body 211, the at least two circular orbits 23 which are inside resist the annular wall body 211 at the internal of the annular wall body 211, so as to prevent eccentricity and waggling when the annular wall body 211 unilaterally suffers resistance from the mass of the food 4000, and ensuring the reliability and stability of the material pushing machine 100.

FIGS. 10A to 10F illustrate a process of the charger 200 supplying power to the material pushing machine 100. The charger 200 is arranged close to a commercial power source, the charging adapter 60 is electrically connected to the commercial power source, the magnetic navigation path 3000 may extend outwardly from the charger 200 to guide the material pushing machine 100 to move closer to the charge 200 along the magnetic navigation path 3000.

Figure 10A:
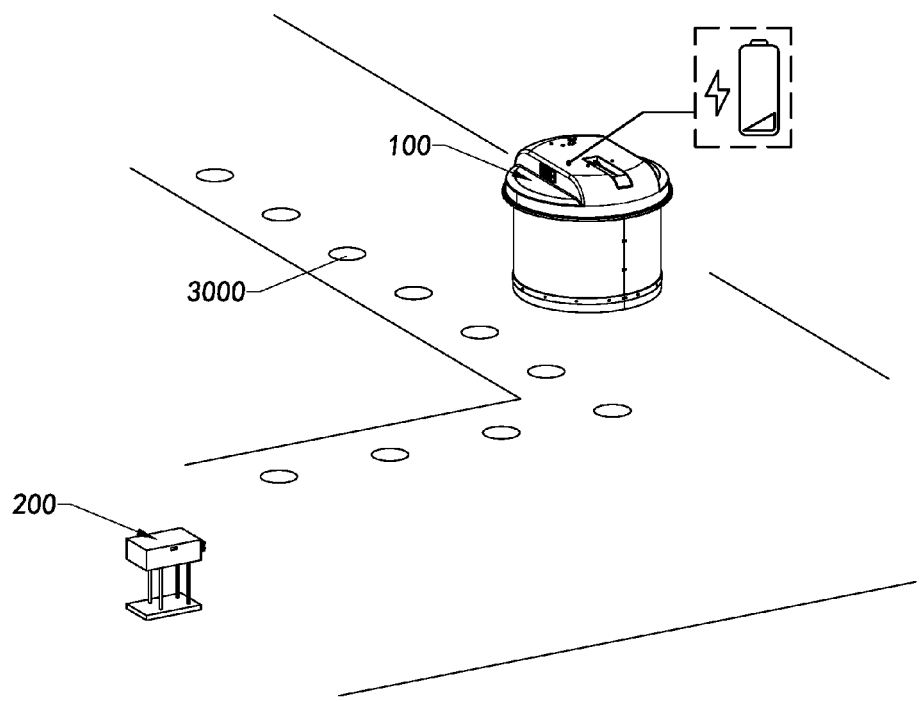
FIGS. 10A to 10F are schematic diagrams of a charging process of the material pushing machine of the material pushing apparatus.
Figure 10B:
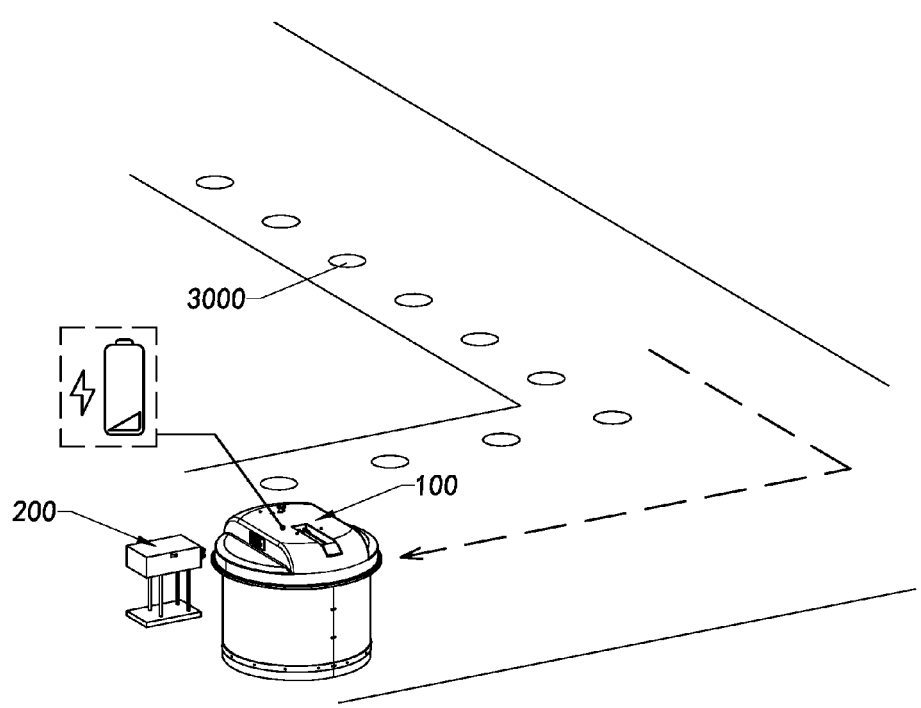
Figure 10C:
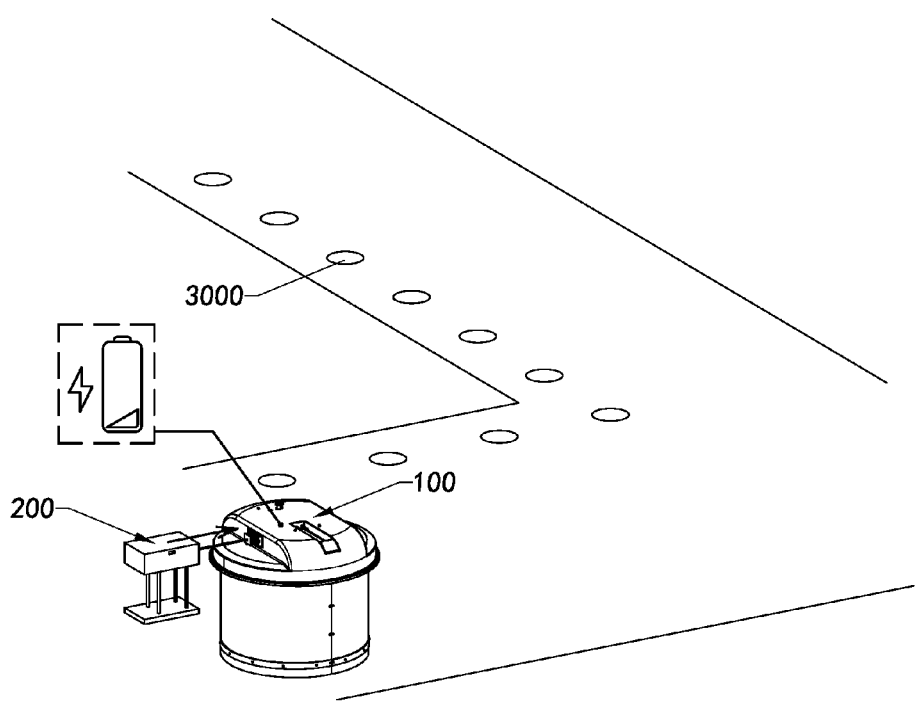
Figure 10D:
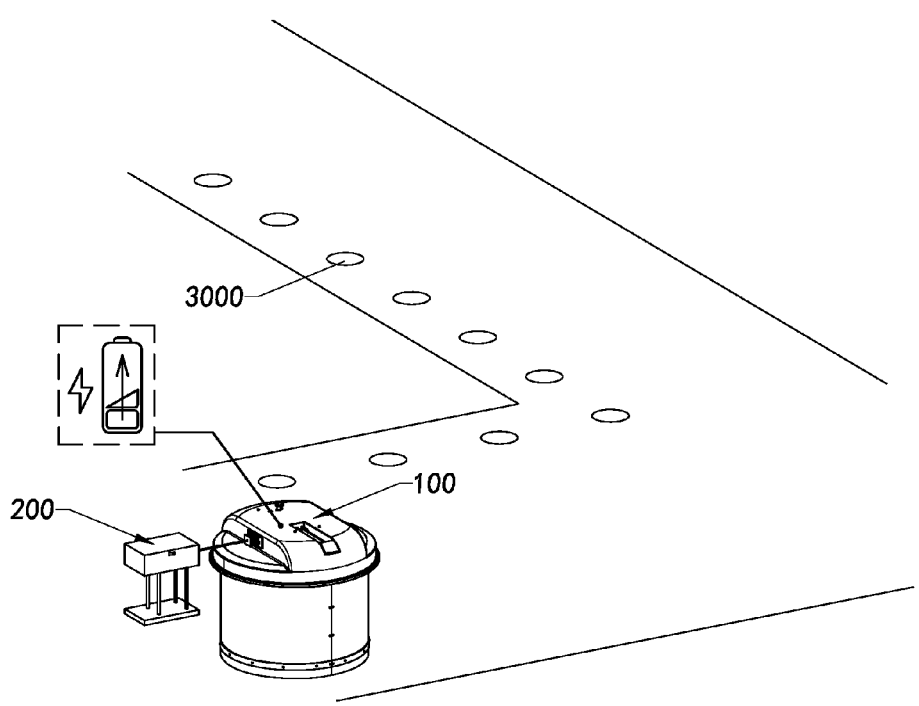
Figure 10E:
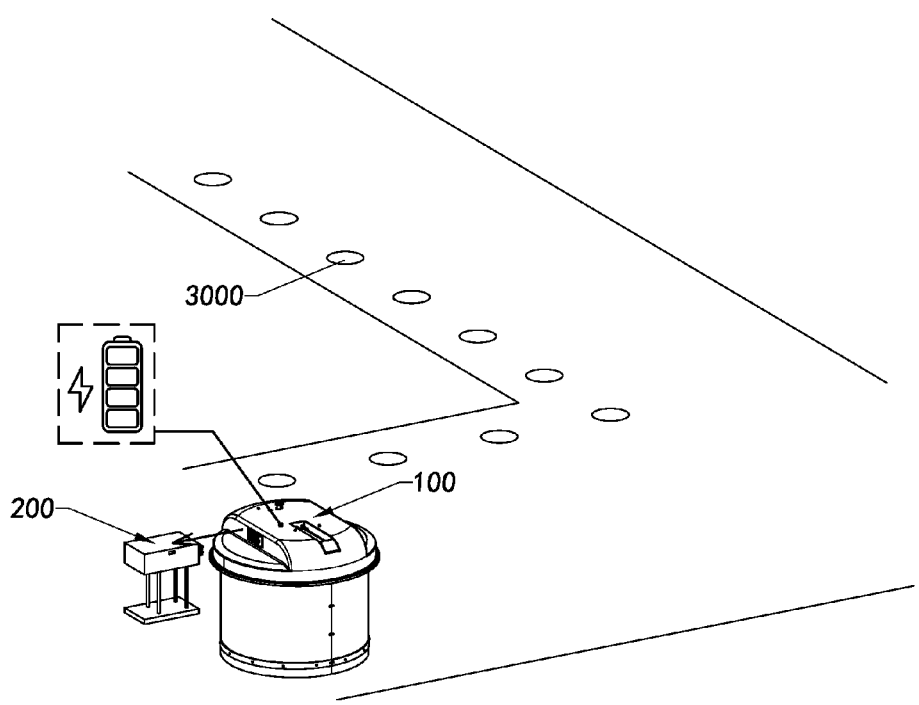
Figure 10F:
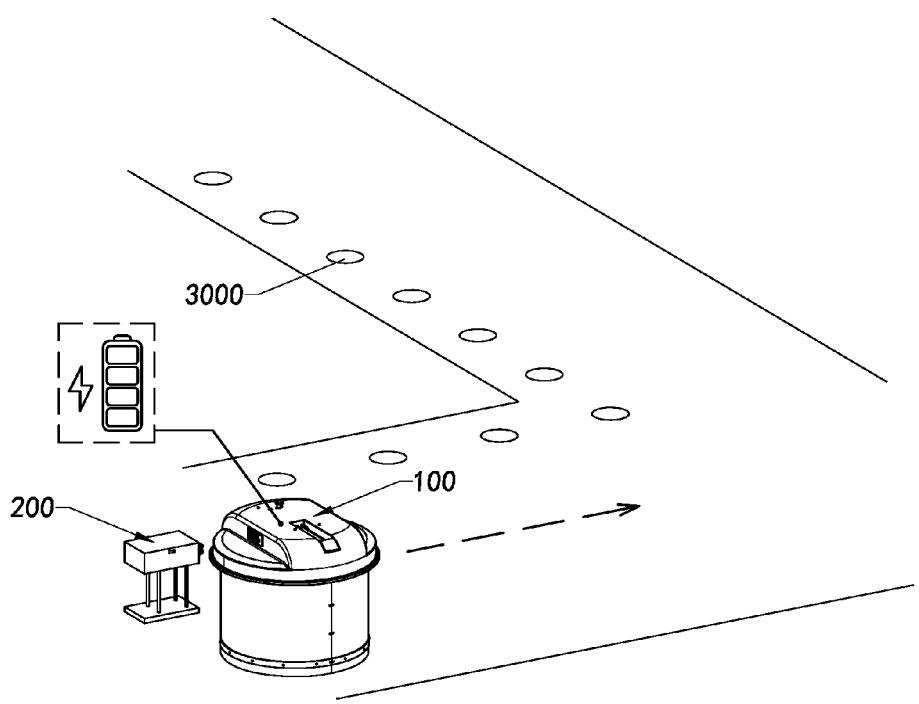

Referring to FIGS. 10A and 10B, when the material pushing machine 100 needs resupply of power, the material pushing machine 100 may move to the charger 200 along the magnetic navigation path 3000. Referring to FIGS. 10C and 10D, the charging adapter 60 may drive the charging assembly 70 to bring the charging end 72 gradually closer to and be inserted in the charging port 50, then the charging electrodes 73 are electrically connected to the charging port 50, thus the charger 200 may supply power again to the power supply assembly 12. Referring to FIGS. 10E and 10F, after the charger 200 charges the material pushing machine 100, the charging adapter 60 may drive the charging assembly 70 to separate the charging end 72 from the charging port 50 and move close to charging adapter 60.

Figure 11:
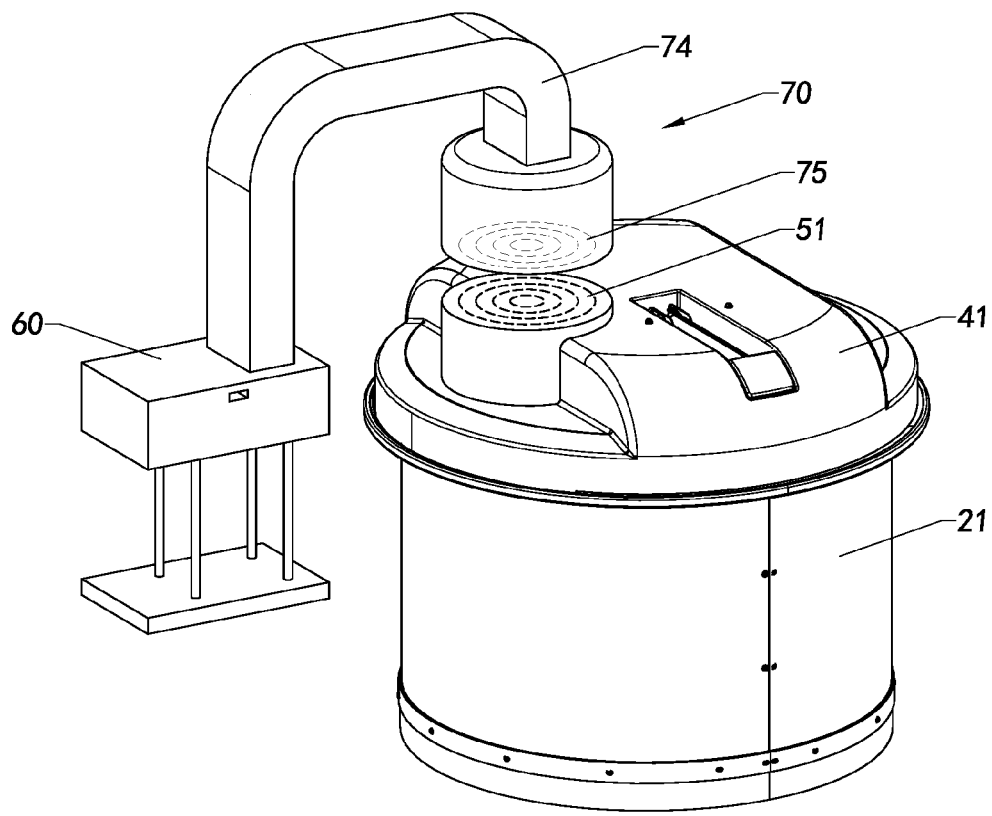
FIG. 11 is a schematic diagram of the material pushing apparatus according to another embodiment of the present disclosure.
Figure 12A:
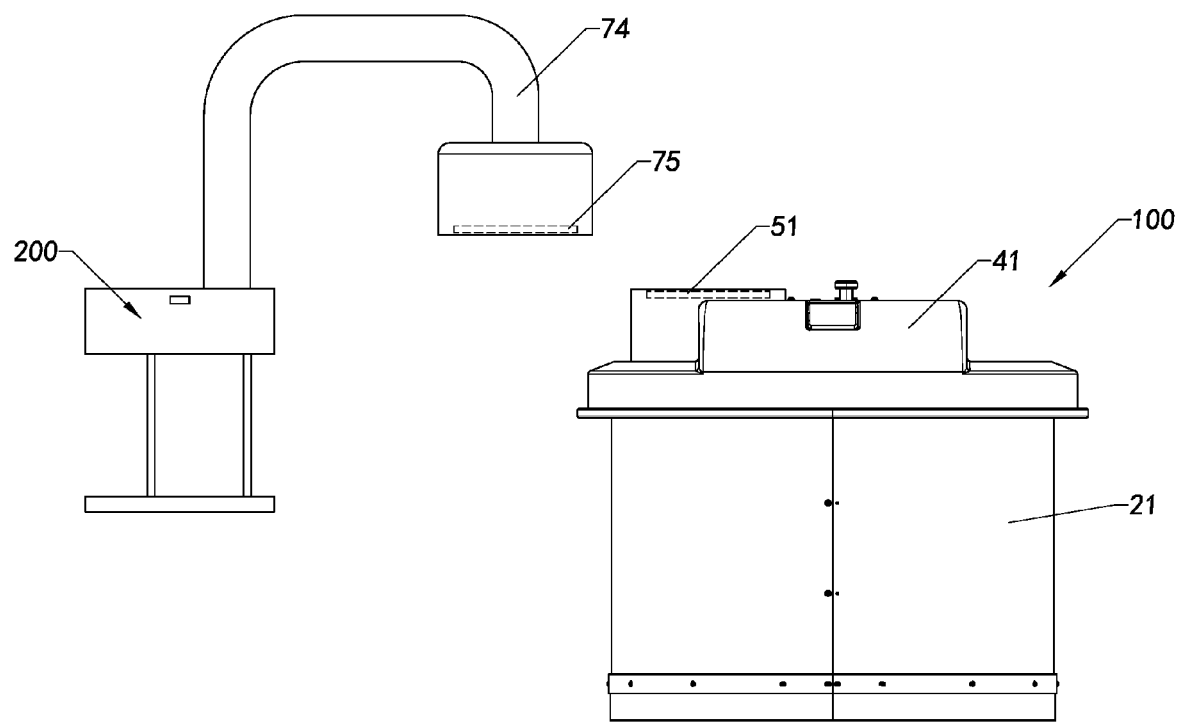
FIGS. 12A and 12B show charging process of the material pushing apparatus.
Figure 12B:
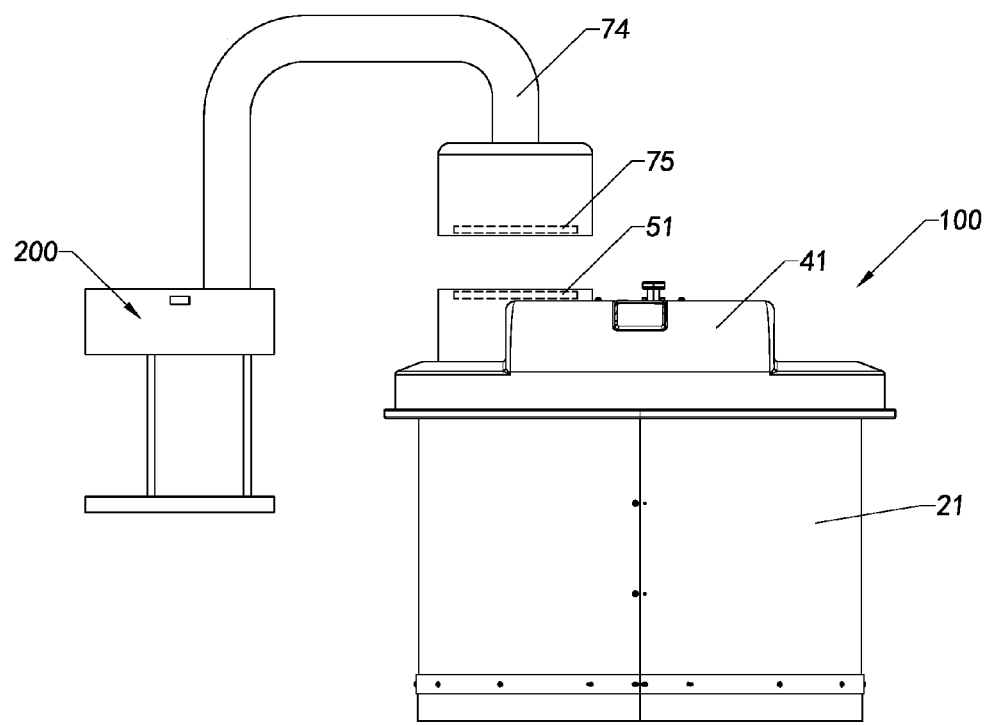

FIGS. 11 to 12B illustrate a material pushing apparatus of another embodiment. This embodiment is different from the material pushing apparatus shown in FIGS. 1 to 10F, in that in the material pushing apparatus shown in FIGS. 11 to 12B, the charging assembly 70 includes a supporting portion 74 and a first charging coil 75 arranged on the supporting portion 74. The supporting portion 74 is arranged on a top portion of the charging adapter 60 and extended outwardly from the top portion of the charging adapter 60. The first charging coil 75 is electrically connected to the charging adapter 60. Correspondingly, the charging port 50 includes a second charging coil 51. The second charging coil 51 is arranged on the cover 41. When the material pushing machine 100 moves to the charger 200, the second charging coil 51 and the first charging coil 75 automatically form an electromagnetic field, so the material pushing machine 100 may be automatically matched to the charger 200, thus the charger 200 may supply power to the material pushing machine 100.

Optionally, in other embodiments of the material pushing apparatus, the supporting portion 74 is arranged on a bottom portion of the charging adapter 60 and extended outwardly from the bottom portion of the charging adapter 60, the second charging coil 51 is arranged on the base plate 111. When the material pushing machine 100 moves to the charger 200, the second charging coil 51 and the first charging coil 75 automatically form the electromagnetic field, so the material pushing machine 100 may be automatically matched to the charger 200, thus the charger 200 may supply power to the material pushing machine 100.

In another embodiment of the present disclosure, a charging method of the material pushing apparatus is provided, the charging method may include the following:
  (a) moving the material pushing machine 100 to the charger 200; and
  (b) allowing the charger 200 to automatically supply power to the material pushing machine 100.

According to one embodiment, process (b) further includes:
  (b.1) applying the charging end 72 to the charging adapter 60 by connecting the connecting end 71 to the charging adapter 60; and (b.2) applying the charging end 72 and the charging electrodes 73 into electrical connection with the charging adapter 60, to allow the charger 200 to automatically supply power to the material pushing machine 100.

Those skilled in the art should understand that the above description and the embodiments of the present disclosure shown in the drawings are only examples and do not limit the present disclosure. The purpose of the present disclosure has been completely and effectively achieved. The functions and structural principles of the present disclosure have been shown and explained in the embodiments. Without departing from the principles, the implementation of the present disclosure may have any deformation or modification.

What is claimed is:

1. A material pushing machine comprising:
a walking device comprising a holding assembly, a power supply assembly, two walking drive motors, two drive wheels, and a supporting wheel, wherein the holding assembly comprises a base plate, the power supply assembly is arranged on the base plate, each of the two walking drive motors is arranged on an opposite side of an end of the base plate and electrically connected to the power supply assembly, each of the two drive wheels is drivable and connected to a corresponding one of the two walking drive motors, the supporting wheel is arranged in a middle of the base plate on another end; and
a material pushing device comprising a material pushing wall, at least two pulley structures, and a circular orbit, wherein the material pushing wall comprises an annular wall body and a connecting arm extending inwardly from a top end of the annular wall body, the connecting arm is connected to the holding assembly, the annular wall body rotatably surrounds the holding assembly, the circular orbit seats to an internal wall of the annular wall body, each of the at least two pulley structures comprises a mounting body and a pulley body rotatably mounted on the mounting body, the pulley body outwardly seats to a smooth surface of the circular orbit to resist an internal of the annular wall body, so each of the at least two pulley structures is mounted to the holding assembly.

2. The material pushing machine according to claim 1, wherein the holding assembly comprises at least two support columns, a holding platform, a mounting column, and a drive ring; each of the at least two support columns is extended from an edge of the base plate to a predetermined height, the holding platform is arranged on a top end of the each of the at least two support columns, a receiving space is formed between the base plate and the holding platform for receiving the power supply assembly, the mounting column is arranged from a center position of the holding platform extending upwardly, the drive ring is rotatably mounted to the mounting column, the connecting arm is connected to the drive ring.

3. The material pushing machine according to claim 2, wherein the walking device further comprises a material pushing drive motor, the material pushing drive motor is arranged on the holding platform and electrically connected to the power supply assembly, the drive ring is drivable and connected to the material pushing drive motor.

4. The material pushing machine according to claim 3, wherein the walking device further comprises a transmission belt, opposite ends of the transmission belt are mounted to an output roller of the material pushing drive motor and the drive ring, so the drive ring is drivable and connected to the material pushing drive motor.

5. The material pushing machine according to claim 2, further comprising a cover device, wherein the cover device comprises a cover, a center position of the cover is mounted on a free end of the holding assembly, a periphery of the cover extends outwardly, a diameter of the cover is greater than the periphery of the annular wall body.

6. The material pushing machine according to claim 5, wherein the cover device further comprises a hold pole and a distance sensor arranged on an end of the hold pole, and another end of the hold pole is arranged on the cover.

7. The material pushing machine according to claim 6, wherein the cover comprises a maintain groove for receiving the hold pole and the distance sensor.

8. The material pushing machine according to claim 5, wherein the cover device comprises a charging port, the charging port is arranged on the cover.

9. The material pushing machine according to claim 8, wherein the mounting column comprises a connected channel for connecting the receiving space and an external space of the holding platform, cables connected to the charging port is extended to the receiving space through the connected channel.

10. A material pushing method of a material pushing machine, the material pushing method comprising:
(a) configuring a walking device to walk along a path outside a fold yard; and
(b) configuring an annular wall body of a material pushing wall of the material pushing machine to rotate relative to a holding assembly of the walking device in a way of surrounding the holding assembly, so the annular wall body pushes food to a predefined area of the fold yard;
wherein the walking device comprising a holding assembly, a power supply assembly, two walking drive motors, two drive wheels, and a supporting wheel, wherein the holding assembly comprises a base plate, the power supply assembly is arranged on the base plate, each of the two walking drive motors is arranged on an opposite side of an end of the base plate and electrically connected to the power supply assembly, each of the two drive wheels is drivable and connected to a corresponding one of the two walking drive motors, the supporting wheel is arranged in a middle of the base plate on another end; the material pushing device comprising a material pushing wall, at least two pulley structures, and a circular orbit, wherein the material pushing wall comprises an annular wall body and a connecting arm extending inwardly from a top end of the annular wall body, the connecting arm is connected to the holding assembly, the annular wall body rotatably surrounds the holding assembly, the circular orbit seats to an internal wall of the annular wall body, each of the at least two pulley structures comprises a mounting body and a pulley body rotatably mounted on the mounting body, the pulley body outwardly seats to a smooth surface of the circular orbit to resist an internal of the annular wall body, so each of the at least two pulley structures is mounted to the holding assembly.

11. The material pushing method according to claim 10, wherein (b) further comprises: driving the annular wall body to rotate relative to the holding assembly by a material pushing drive motor.

12. The material pushing method according to claim 11, wherein when the material pushing drive motor drives the annular wall body to rotate relative to the holding assembly at an upper end of the annular wall body, at least two pulley structures arranged on the holding assembly resist against an interior of the annular wall body.

13. The material pushing method according to claim 12, further comprising: configuring a pulley body of each of the at least two pulley structures to rotate relative to the annular wall body along a circular orbit arranged on the annular wall body.

14. The material pushing method according to claim 10, further comprising: allowing a power supply assembly to supply power to two walking drive motors arranged on a base plate of the holding assembly, to allow the two walking drive motors to drive a drive wheel of the walking device to walk along the path.

* * * * *